United States Patent [19]

Bhowmik et al.

[11] Patent Number: 4,723,247

[45] Date of Patent: Feb. 2, 1988

[54] PHASE CONJUGATING PLASMA MIRROR FREE ELECTRON LASER

[75] Inventors: Anup Bhowmik, Newbury Park; Wayne A. McMullin, Chatsworth, both of Calif.

[73] Assignee: Rockwell International Corporation, El Segundo, Calif.

[21] Appl. No.: 8,986

[22] Filed: Jan. 30, 1987

[51] Int. Cl.[4] .................................................. H01S 3/00
[52] U.S. Cl. ........................................ 372/2; 372/108; 372/101; 372/99
[58] Field of Search ...................... 372/2, 108, 101, 98, 372/99, 107

[56] References Cited

U.S. PATENT DOCUMENTS 3,822,410 7/1974 Madey ................................. 331/94.5
4,529,273 7/1985 Cronin-Golomb et al. .......... 372/99

OTHER PUBLICATIONS

P. Hribek, et al., "Model Locking in a Neodymium Glass Laser with a Plasma Mirror" Sov. J. Quantum Electron. 13 (12), Dec. 1983, pp. 1637-1638.
B. Gellert and B. Kronast, "Investigation of Stimulated Brillouin Scattering Under Well-Defined Interaction Conditions", Applied Physics B, Spring 1984, pp. 29-41.
P. Hribek and M. Vrbova, "Nd-Glass Laser with Plasma Mirror", Czech. J. Phys. B 35 (1985), pp. 1331-1340.

Primary Examiner—Léon Scott, Jr.
Attorney, Agent, or Firm—H. Fredrick Hamann; Harry B. Field; Lawrence N. Ginsberg

[57] ABSTRACT

A self-aligning, high-power, free electron laser (FEL) oscillator 10, comprises a self-aligning feedback, element 12 located near the electron beam input end 14 I of the FEL wiggler 16; a partially transmitting stimulated Brillouin scattering (SBS) plasma mirror 18 located near the output end 20 of the laser wiggler 16; and a plurality of laser beam expansion elements 32-32[n] located in succession on the path of the resulting output laser beam 34 for magnifying the output laser beam 34 to a desired output diameter. A totally reflecting, removable start-up mirror 30 is located between SBS plasma mirror 18 and laser beam expansion elements 32-32[n]. The removable start-up mirror 30 provides feedback until the SBS threshold is reached.

13 Claims, 1 Drawing Figure

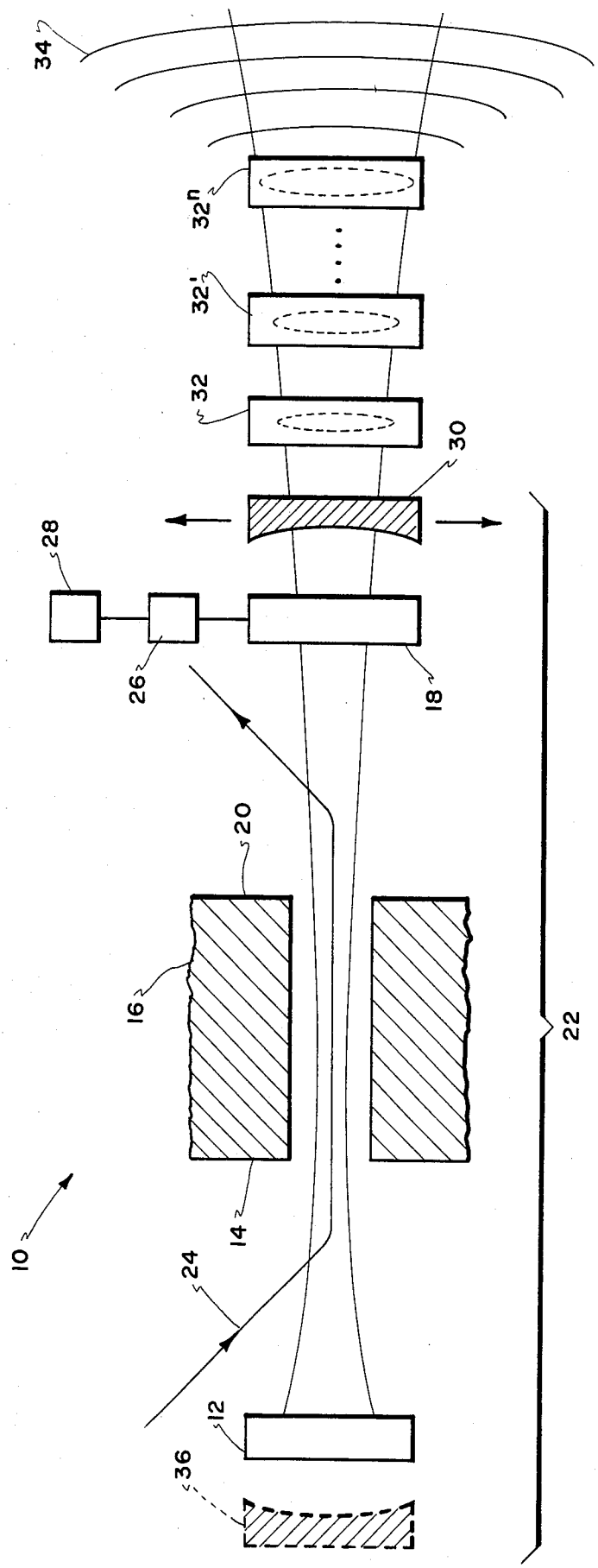

PHASE CONJUGATING PLASMA MIRROR FREE ELECTRON LASER

BACKGROUND OF THE INVENTION

1. Field of the Invention

This invention relates to laser oscillators and more particularly to a self-aligning, high-power laser oscillator for a free electron laser (FEL).

2. Description of the Prior Art

It is well known that free electron lasers are efficient sources of coherent, high power, tuneable radiation in the millimeter, far- and near-infrared, and visible wavelength regimes. The free electron laser (FEL), in its bare essentials, consists of a high-energy electron beam that, when properly phased, interacts with a superimposed laser beam in the transverse periodic magnetic field of a wiggler as considered in U.S. Pat. No. 3,822,410, issued to J. M. J. Madey. Typically the electron beam (e-beam) energy is many millions of electron volts, and its diameter a fraction of a millimeter. The length of the interaction region in the wiggler is several meters. Since the interaction occurs in such a small cross-sectional area but over several meters, this geometry results in a laser output with a power density which is extremely high. Laser output with peak power densities of several $GW/cm^2$ are routinely obtained.

In prior art FEL's that rely on standard, stable optical resonators with conventional, material optics the incidence of such high flux densities on optics results in the coatings and/or their substrates having limited life. Also, the requirement for coalignment between the millimeter diameter e-beam and the laser beam is very critical. To minimize the incident power density on the mirrors through diffraction spreading of the beam the spacing between mirrors must be drastically increased. However, the alignment sensitivity of the resonator then increases dramatically to a point where the application of the stable resonator to a high power FEL becomes impractical.

SUMMARY AND OBJECTS OF THE INVENTION

A primary object of the present invention, therefore, is to provide a compact and high-power free electron laser oscillator, whose optical elements are immune to damage and are compatible with the vacuum environment of the e-beam.

Another object is to provide a free electron laser oscillator which is self-aligning.

Another object is to provide a laser oscillator which provides a high-quality free electron laser beam at high powers.

Other objects, advantages and novel features of the present invention will become apparent from the following detailed description of the invention when considered in conjunction with the accompanying drawing.

The invention, in its broadest aspeacts, comprises a self-aligning, feedback element located near the electron beam input end of the FEL wiggler; a partially transmitting stimulated Brillouin scattering (SBS) plasma mirror located near the output end of the laser wiggler; and a plurality of laser beam expansion elements located in succession on the path of the resulting output laser beam for magnifying the output laser beam to a desired output diameter. A totally reflecting, removable start-up mirror is located between the SBS plasma mirror and the plurality of laser beam expansion elements. The removable start-up mirror provides feedback until the SBS threshold is reached. The feedback element may comprise, for instance, a corner cube, a right circular cone or a second SBS plasma mirror.

In the present invention the damage problem inherent in prior art systems is alleviated by the use of at least one plasma mirror that is immune to damage. Furthermore, alignment sensitivity is eliminated by the use of self-aligning elements resulting in a compact, high-power FEL. The benefits of the present system are highlighted when the feedback element is a plasma mirror because in this instance both sides of the FEL resonator consist of plasma elements. Therefore, even at very high power densities, the resonator is immune to damage from the intense FEL beam. If the feedback element comprises a corner cube or right circular cone it should be located farther from the wiggle to alleviate possible damage to its surfaces. However, in both of these instances, any inordinately large or unacceptable alignment sensitivity is not introduced in the resonator because both the corner cube and the right circular cone are self-aligning.

BRIEF DESCRIPTION OF THE DRAWINGS

The sole FIGURE is a schematic illustration of the preferred embodiment of the present invention.

The same elements or parts throughout the figures of the drawings are designated by the same reference characters, while equivalent elements bear a prime designation.

DETAILED DESCRIPTION OF THE INVENTION

In the sole FIGURE, the apparatus for producing a high-quality, high-power, free electron laser (FEL) beam is indicated generally as 10. A self-aligning, highly reflecting, feedback element 12 is located near the input end 14 of a wiggler 16. Feedback element 12 may, for instance, be comprised of a corner cube, a right circular cone or a stimulated Brillouin scattering (SBS) plasma mirror. A self-aligning, partially transmitting, SBS plasma mirror output element 18 is located near the output end 20 of the wiggler 16.

The self-aligning property of the corner cube and right circular cone derives from cancellation of alignment errors through multiple reflections in the element 12 itself. The self-aligning property of the SBS plasma mirror (whether used as a feedback element 12, or output element 18) derives from the phase conjugating nature of the stimulated Brillouin scattering process. Phase conjugating elements reflect a beam to its point of origin regardless of the orientation of the element.

Plasmas have been used for magnetic and inertial confinement fusion applications. Recently, their optical properties have been investigated in laser fusion where their high reflectance properties have been observed. Nearly 100% reflectance from plasmas via the SBS process has been reported in the article entitled, "Investigation of Stimulated Brillouin Scattering Under Well-Defined Interaction Conditions" by G. Gellert and B. Kronast, Applied Physics B 33, 29–41 (1984).

Optical pulse characteristics have been studied in a neodymium laser where stimulated Brillouin backscattering is attributed to plasma reflectivity causing mode-locking. See article entitled, "Mode Locking in a Neodymium Glass Laser with a Plasma Mirror" by P. Hribek, V. Kubecek and M. Vrbova, Sov. J. Quant. Electron., Dec. 1983, pgs. 1637–1638.

The observed high reflectance through SBS from plasmas and their self-aligning property as well as their immunity to damage under very high laser intensities is utilized in the present apparatus 10 to generate a compact, high power, FEL resonator defined by bracket 22 comprising feedback element 12 and output element 18.

An electron beam 24 is introduced into the wiggler 16 at input end 14 to coincide with the common optical axis of the resonator 22. The electron beam is directed out of the oscillator 10 at the output end 20. The transmittance of the output element 18 is controlled by temperature control means 26 and magnetic field control means 28.

A removable start-up mirror 30 provides feedback until the SBS threshold is reached (as more fully described below). A plurality of laser beam expansion elements 32, 32', ...32$^n$ are located in succession on the path of the output laser beam 34. The expansion elements 32-32$^n$ may be plasma lenses, aerodynamic lenses, or conventional optical lenses and mirrors or combinations thereof.

During the start-up operation the electron beam 24 is introduced into the wiggler 16 thus emitting spontaneous radiation. The radiation is, at this point in time, completely transmitted by the plasma mirror output element 18 because the radiation level is below the SBS threshold. The radiation is then completely reflected by the removable mirror 30 toward the feedback element 12. If an SBS plasma mirror is used as a feedback element then, at this low level of radiation, an auxiliary totally reflecting feedback mirror 36 is utilized. To provide synchronism with the electron beam 24 the axial location of this mirror 36 is adjustable.

The radiation is then reflected back toward the wiggler 16 where it is superimposed and synchronized with the arrival of the electron beam 24. The radiation superimposed with the electron beam 24 is amplified in the wiggler 16 and the output is then incident on the SBS output element 18 and subsequently reflected back from the removable mirror 30. This process is continued until the SBS threshold is reached.

Once this threshold is reached, laser oscillation is sustained by the feedback element 12 and the SBS output element 18. If an SBS plasma mirror is used as the feedback element 12 it becomes totally reflective by appropriate choice of plasma parameters. Once sustained oscillation has been reached, mirror 30 is removed. Removal may be provided by, for example, a pneumatic or hydraulic drive or by mounting the mirror 30 on rotating machinery.

Once the mirror 30 is removed the output laser beam 34 is incident on beam expansion elements 32-32$^n$. The positions of these elements (and focal lengths if plasma lenses are used) are adjusted to provide the desired output laser beam diameter.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A self-aligning, high power, free-electron laser (FEL) oscillator, comprising:
   (a) a partially transmitting, stimulated Brillouin scattering (SBS) plasma mirror output element located near the output end of the FEL wiggler for reflecting a portion of the radiation emitted by the FEL wiggler back through said wiggler;
   (b) a self-aligning, feedback element located near the electron beam input end of the FEL wiggler for reflecting said portion of radiation from said output element back through said FEL wiggler;
   (c) a plurality of laser beam expansion elements in succession on the path of the resulting output laser beam for magnifying said laser beam to a desired output diameter; and
   (d) a totally reflecting, removable start-up mirror located between said SBS plasma mirror and said plurality of laser beam expansion elements, said removable start-up mirror for providing feedback until the SBS threshold is reached.

2. The laser oscillator of claim 1 wherein said self-aligning feedback element comprises a corner cube.

3. The laser oscillator of claim 1 wherein said self-aligning feedback element comprises a right circular cone.

4. The laser oscillator of claim 1 wherein said self-aligning feedback elements comprises a second stimulated Brillouin scattering (SBS) plasma mirror.

5. The laser oscillator of claim 4 wherein a reflecting, stationary, start-up mirror is provided behind said self-aligning feedback element for reflecting radiation transmitted through said second SBS plasma mirror prior to the SBS threshold being achieved.

6. The laser oscillator of claim 1 wherein said beam expansion elements each comprises a plasma lens.

7. The laser oscillator of claim 1 wherein said laser beam expansion elements each comprises an aerodynamic lens.

8. The laser oscillaor of claim 1 wherein said laser beam expansion elements each comprises an optical lens.

9. The laser oscillator of claim 1 wherein said laser beam expansion elements each comprises an optical mirror.

10. The laser oscillator of claim 1, further including means for adjusting the transmittance of said SBS plasma mirror by varying the plasma temperature.

11. The laser oscillator of claim 1, further including means for adjusting the transmittance of said SBS plasma mirror by varying the plasma density.

12. A method for producing a high-quality, high-power, free-electron laser (FEL) beam, comprising the steps of:
   (a) starting up the laser comprising the sequential steps of:
      (1) introducing an electron beam into the wiggler which emits spontaneous radiation below the stimulated Brillouin scattering (SBS) threshold,
      (2) transmitting said radiation from step (1) through a stimulated Brillouin scattering (SBS) plasma mirror said SBS plasma mirror located near the output end of the FEL wiggler,
      (3) completely reflecting the radiation from step (2), by a totally reflecting removable start-up mirror behind said SBS plasma mirror, toward a feedback means near the electron beam input end of the FEL wiggler,
      (4) completely reflecting the radiation from step (3), by said feedback means, back into the wiggler in synchronysm with the electron beam for amplification, and (5) sequentially repeating steps (1)–(4) until the circulating radiation is amplified to a power level equal to the threshold of the SBS plasma mirror;

(b) removing said totally reflecting removable mirror from the path of the output radiation;

(c) adjusting the SBS plasma mirror until sustained laser oscillation and desired output is achieved; and (d) positioning a plurality of laser beam expansion elements located in succession on the path of the resulting output laser beam to achieve the desired output beam diameter.

13. The method of claim 12 wherein step (a)(4) includes the steps of:

transmitting the radiation from step (a)(3), which is below SBS threshold, through a second SBS plasma mirror, and completely reflecting the radiation transmitted through said second SBS plasma mirror by a totally reflecting start-up mirror located behind said second SBS plasma mirror.

* * * * *